(12) United States Patent
Suzuki

(10) Patent No.: US 6,231,332 B1
(45) Date of Patent: May 15, 2001

(54) PIZZA RICE MOLDING APPARATUS

(76) Inventor: Kisaku Suzuki, 2-Chome 3-15 Shinju-ku, Tokyo (JP)

( * ) Notice: Subject to any disclaimer, the term of this patent is extended or adjusted under 35 U.S.C. 154(b) by 0 days.

(21) Appl. No.: 09/315,053

(22) Filed: May 20, 1999

(30) Foreign Application Priority Data

May 22, 1998 (JP) .................................................. 10-158448

(51) Int. Cl.⁷ ..................................................... A23P 1/10
(52) U.S. Cl. ..................... 425/364 R; 425/394; 425/397; 425/403; 426/512
(58) Field of Search ............................. 425/364 R, 394, 425/397, 403, 451.3; 426/512

(56) References Cited

U.S. PATENT DOCUMENTS

| | | | | |
|---|---|---|---|---|
| 3,177,822 | * | 4/1965 | Archer | 425/364 R |
| 3,411,461 | * | 11/1968 | Groth | 425/397 |
| 4,460,611 | * | 7/1984 | Suzuki | 426/512 |
| 5,137,745 | * | 8/1992 | Zukerman et al. | 426/512 |
| 5,431,942 | * | 7/1995 | Baird | 426/512 |

FOREIGN PATENT DOCUMENTS 4-108351  *  4/1992  (JP) ................................. 425/364 R 9-238625  *  9/1997  (JP) .

* cited by examiner

Primary Examiner—Robert Davis
(74) Attorney, Agent, or Firm—Israel Gopstein

(57) ABSTRACT

A pizza rice molding apparatus enhances the efficiency of molding a pizza rice having a substantially true circular disc-like shape and a highly valuable quality. The apparatus comprises a feed conveyer belt which can be longitudinally moved back and forth, for intermittently feeding a square planar rice food which has been compressed and fed onto the belt conveyer, a molding frame composed of a pair of molding dies which are curved outward symmetrically, and which are arranged so as to be openable and closable in a direction orthogonal to the longitudinal direction of the feed conveyer belt, and an opening and closing mechanism and an elevating mechanism for the pair of molding dies, wherein the pair of molding dies have parts which correspond to side parts of a square planar rice food and which are formed into arcuate side molding parts, and parts which correspond to corner parts thereof, and which are formed into corner molding parts which are convex inward from the arcuate side molding parts. Accordingly, the planar rice food is formed into a deformed disc-like shape in a plan view, having the corner part which are segmental.

1 Claim, 9 Drawing Sheets

PIZZA RICE MOLDING APPARATUS

BACKGROUND OF THE INVENTION

1. Field of the Invention

The present invention relates to an apparatus for molding pizza rice.

2. Related Art

Conventionally, there has been well-known pizza rice in which various ingredients such as salami, cheese, ham and bacon as toppings are set on the upper surface of a disc-like molded rice food, similar to a pizza using dough.

The pizza rice has been conventionally molded through manipulation. However, it is difficult and time-consuming to mold a rice food having a predetermined hardness and a predetermined shape through manipulation, and accordingly, it is impossible to satisfactorily supply great demand.

Accordingly, the applicant proposed an automated apparatus for molding pizza rice, which is disclosed in Japanese Laid-Open Patent No. H9-238625.

In the above-mentioned pizza rice molding apparatus, a planar rice food transferred by an intermittent transfer conveyer belt, is cut into a square shape by a cutting mechanism, and a pair of molding dies which are symmetrically curved outward so as to have a semi-circular shape are closed so as to a circular shape as viewed in a plan view, and are then lowered for press-cutting the planar rice food a into a disc-like rice food b. Thereafter, the molding dies are opened so as to push remaining rice foods C after cutting, toward opposite sides of the intermittent transfer conveyer belt for discharging them.

However, in the above-mentioned conventional molding apparatus, the quantity of the remaining rice foods C after cutting becomes large, and accordingly, they are accommodated in a container, or they are automatically returned to a rice food hopper for reuse thereof. Should these remaining rice foods C after cutting be repeatedly reused, the density of rice foods would become nonuniform, or the rice food would stiffen so that the taste and the food feeling deteriorate. Thus, there has been raised a problem such that pizza rice having a high commercial value can not be produced.

Explanation will be made of a comparison example with reference to FIG. 18.

In this comparison example, a pair of molding dies d, d which are symmetrically curved outward so as to have a semicircular shape as viewed in a plan view, are closed so as to define a circular shape as viewed in a plan view, and a square planar rice food a is compressed and molded into a disc-like molded rice food by closing the molding dies d, d into the circular shape as viewed in a plan view.

However, in the above-mentioned comparison example, should a square planar rice food a be compressed into a circular shape by the semicircular molding dies d, d, the degree of compression is different between the side parts $a_1$, $a_1$ and the corner parts $a_2$, $a_2$ of the square planar rice food a and accordingly, the degree of radial restoration after opening the molding dies, is small in the side parts $a_1$ ..., but is large in the corner parts $a_2$ ... due to the elasticity of the rice food. As a result, as shown in FIG. 19, the parts which were previously the corner parts $a_2$ ... of the planar rice food a bulge outward, and accordingly, it is impossible to obtain a true-circular shape rice food, that is, only a low quality deformed pizza $b_1$ is produced.

SUMMARY OF THE INVENTION

The present invention is devised in view of the state of the above-mentioned conventional apparatus, and accordingly, an object of the present invention is to provide an automated molding apparatus for pizza rice, which can efficiently mold a square planar rice food into a high quality pizza rice having a predetermined hardness and a predetermined shape (circular shape).

To the end, according to the present invention, there is provided a molding apparatus for pizza rice, comprising a feed conveyer belt which can be longitudinally moved back and forth, for intermittently feeding a square planar rice food which has been compressed and fed onto the belt conveyer, a molding frame composed of a pair of molding dies which are curved outward symmetrically, and which are arranged so as to be openable and closable in a direction orthogonal to the longitudinal direction of the feed conveyer belt, and an opening and closing mechanism and an elevating mechanism for the pair of molding dies, wherein the pair of molding dies have parts which correspond to side parts of a square planar rice food and which are formed into arcuate side molding parts, and parts which correspond to corner parts thereof, and which are formed into corner molding parts which are convex inward from the arcuate side molding parts, and accordingly, the planar rice food is formed into a deformed disc-like shape in plan view, having the corner part which are segmental.

Detailed explanation will be made of an embodiment of the present invention with reference to the drawings which are:

DETAILED DESCRIPTION OF PREFERRED EMBODIMENTS OF THE INVENTION

Referring to FIGS. 1 to 5, a pizza rice molding apparatus is composed of a rice food supply mechanism A, a rice food compressing mechanism B, a planar rice food cutting mechanism C, an intermittently transfer conveyer belt D, a feed conveyer belt E for a planar rice food, a molding frame F, an opening and closing mechanism G and an elevating mechanism H for the molding frame, a drive source I for the opening and closing mechanism G, a drive source J for the elevating mechanism H, and drive sources which are not shown, for the rice food supply mechanism A, a rice food compressing mechanism B, the planar rice food cutting mechanism C, and the intermittent transfer conveyer belt E.

Figure 5:
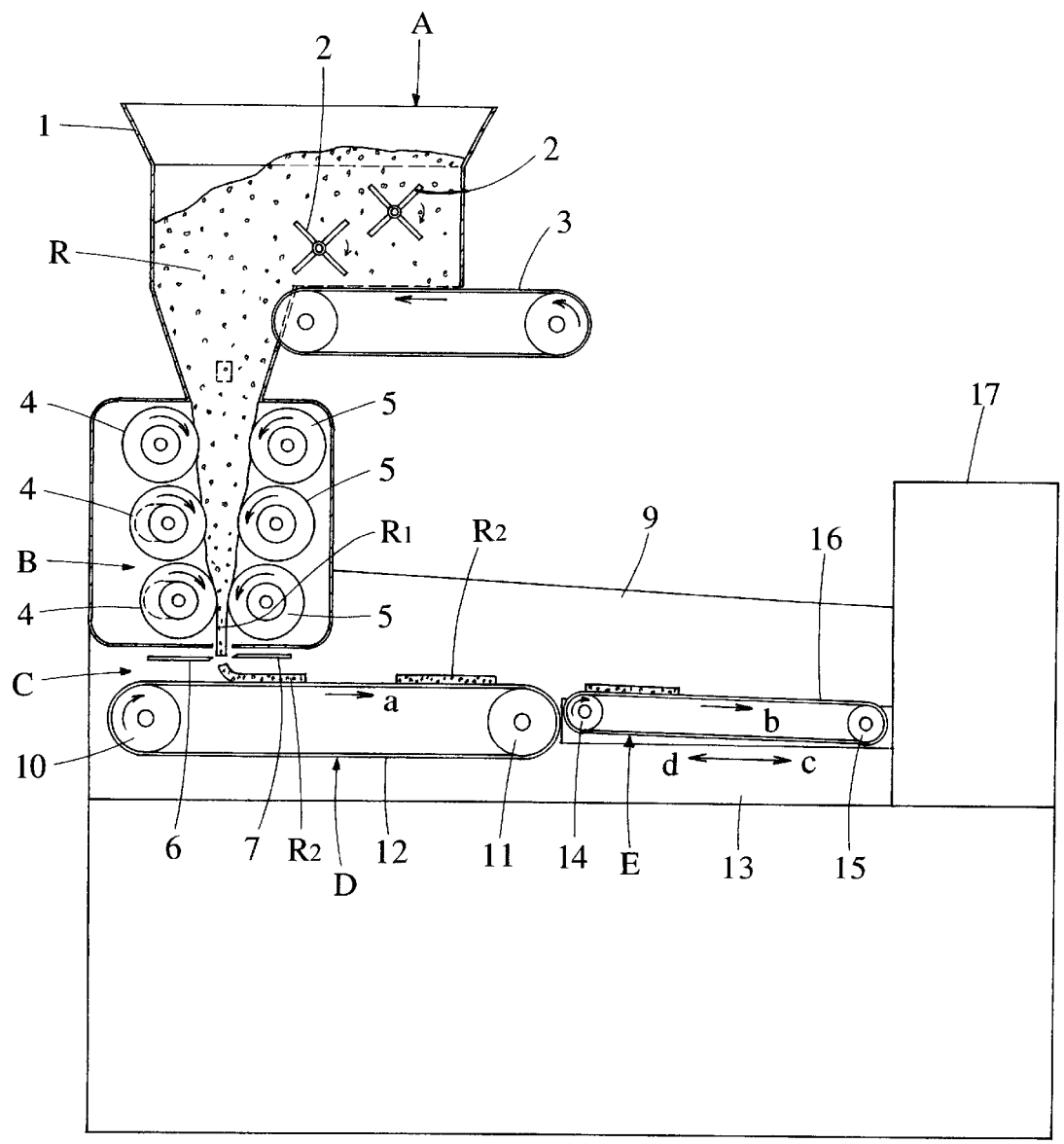
FIG. 5 is a side view illustrating the apparatus in its entirety.

In the rice food supply mechanism A, as shown in FIG. 5, rice food R in a rice food hopper 1 is fed into the rice food compressing mechanism B located therebelow by means of a rice food transfer conveyer belt 3 while it is loosened by agitating bars 2, 2.

In the rice food compressing mechanism B, as shown in FIG. 5, a plurality of rollers 4 . . . , 5 . . . are vertically arranged at predetermined pitches, being journalled and opposed in a V-like shape as viewed in a front view, and accordingly, the rice food R fed from the rice food hopper 1 is compressed and molded into a planar rice food having a predetermined thickness. Further, the rice food compressing mechanism B may include an endless belt which is not shown and which is wound around the rollers 4 . . . , 5 . . . .

In the rice food cutting mechanism C, as shown in FIG. 5, a pair of cutters 6, 7 are horizontally arranged, being crosswise opposed, and are opened and closed by a drive source which is not shown, so that the compressed and molded planar rice food $R_1$ is cut into a square planar rice food $R_2$.

The above-mentioned intermittent transfer conveyer belt D, as shown in FIG. 5 is composed of a drive roller 10 and a driven roller 11 which are journalled respectively to the rear parts and substantially intermediate parts of left and right side panels 9, 9 which are planted upright on a frame 8, and an endless belt 12 wound around the rollers 10, 11. Accordingly, the planar rice food $R_2$ can be intermittently and horizontally transferred in a forward direction indicated by the arrow a (the rightward direction in FIG. 5).

Figure 1:
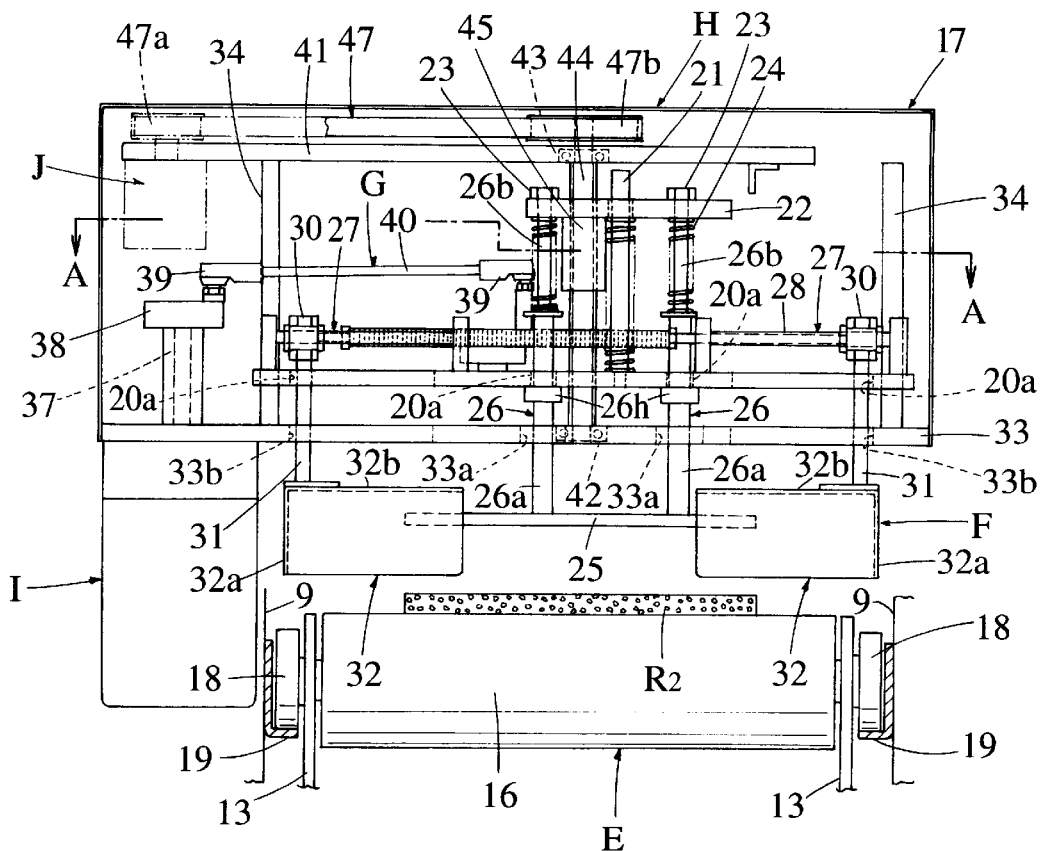
FIG. 1 is a front view illustrating a main part of an embodiment of a pizza rice molding apparatus according to the present invention in a condition in which molding dies are opened.
Figure 2:
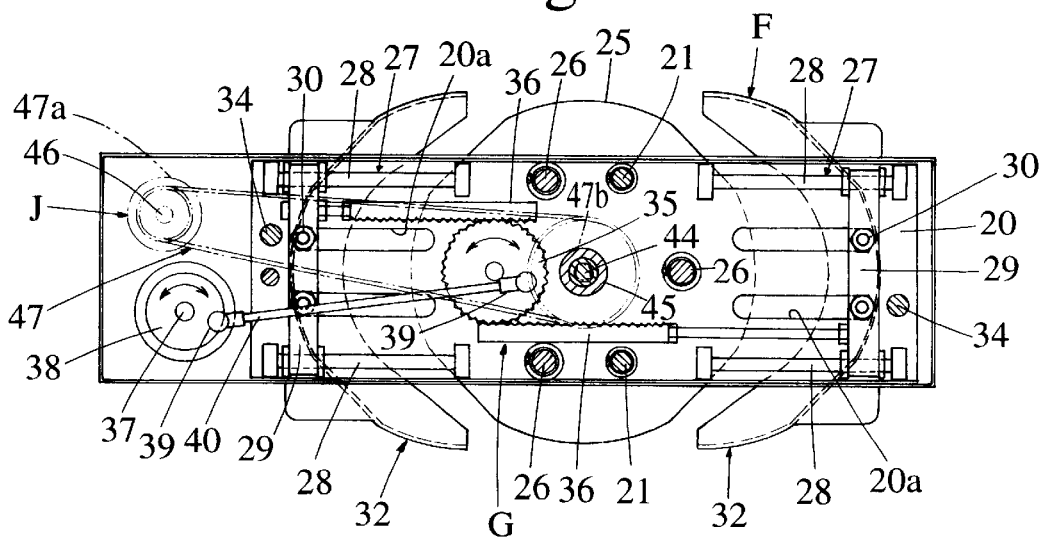
FIG. 2 is a sectional view as viewed in the direction of the arrows along line A—A in FIG. 1.
Figure 3:
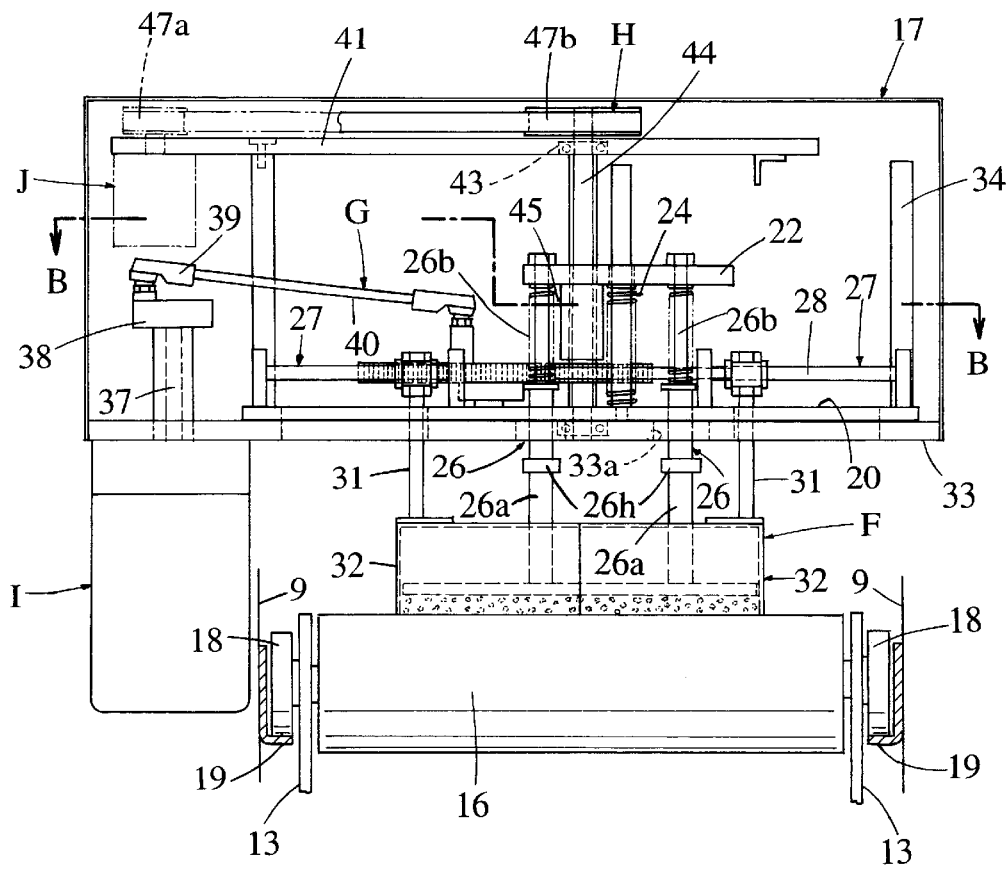
FIG. 3 is a front view illustrating the main part of the apparatus shown in FIG. 1, in a condition in which the molding dies are closed.

The planar rice feed conveyer belt E, as shown in FIGS. 1, 3 and 5, is composed of a drive roller 14 and a driven roller 15 which are journalled respectively to the front and rear parts of left and right conveyer frames 13, 13, and an endless belt 16 wound around the rollers 14, 15, and the conveyer belt E can be intermittently rotated in the forward direction indicated by the arrow b (rightward direction in FIG. 5), the forward part of the conveyer belt E being slightly inclined downward. Further, the planar rice food conveyer belt E is moved back and forth in the longitudinal direction, as indicated by the arrows c, d, relative to a housing 17 in which the molding frame F, the opening and closing mechanism G and the elevating mechanism H for the molding frame F and the drive sources I, J therefor, are incorporated, as shown in FIGS. 1 to 4.

A longitudinal feed means of the planar rice food feed conveyer belt E, as shown in FIGS. 1 and 3, is composed of a plurality of rollers 18, 18 . . . journalled to the outer surfaces of the left and right conveyer frames 13, 13, and guide rails 19, 19 which are long in the longitudinal direction and with which the rollers 18, 18 . . . are engaged so as to slide thereon. Accordingly, the feed conveyer belt E can be reciprocated by a predetermined stroke in the longitudinal direction by means of a well-known reciprocating mechanism.

The above-mentioned molding frame F, as shown in FIGS. 1 to 4, is mainly composed of a horizontal lower elevatable panel 20 which is long in the crosswise direction, having a square shape as viewed in a plan view, a horizontal upper elevatable panel 22 inserted onto upper parts of a pair of guide rods 21, 21 planted upright on the left and right parts of the upper surface of a substantially center part of the lower elevatable panel 20, compression springs 24 being fitted thereonto so that the upper elevatable panel 22 can be elevated, three push-down rods 26, 26, 26 fixed at their upper end to the upper elevatable panel 20 by means of bolts 23 so as to be suspended downward, slidably inserted in through-holes which will be detailed later, and which are formed in the lower elevatable panel 20, and fixed at their lower ends with a horizontal press board 25, a pair of guide mechanisms 27, 27 in which a pair of two guide rails 28, 28 are laid on the left and right sides of the upper part of the lower elevatable panel 20, being spaced from each other by a predetermined distance, being long in the crosswise direction, and being parallel with each other, and a pair of openable and closable molding dies 32, 32 fixed to the lower ends of support bars 31, 31, which are fixed at their upper ends to slide bars 29, 29 carried by both guide mechanisms 27, 27 so as to be crosswise movable, by means of nuts 30, 30, and which are suspended downward.

Figure 6:
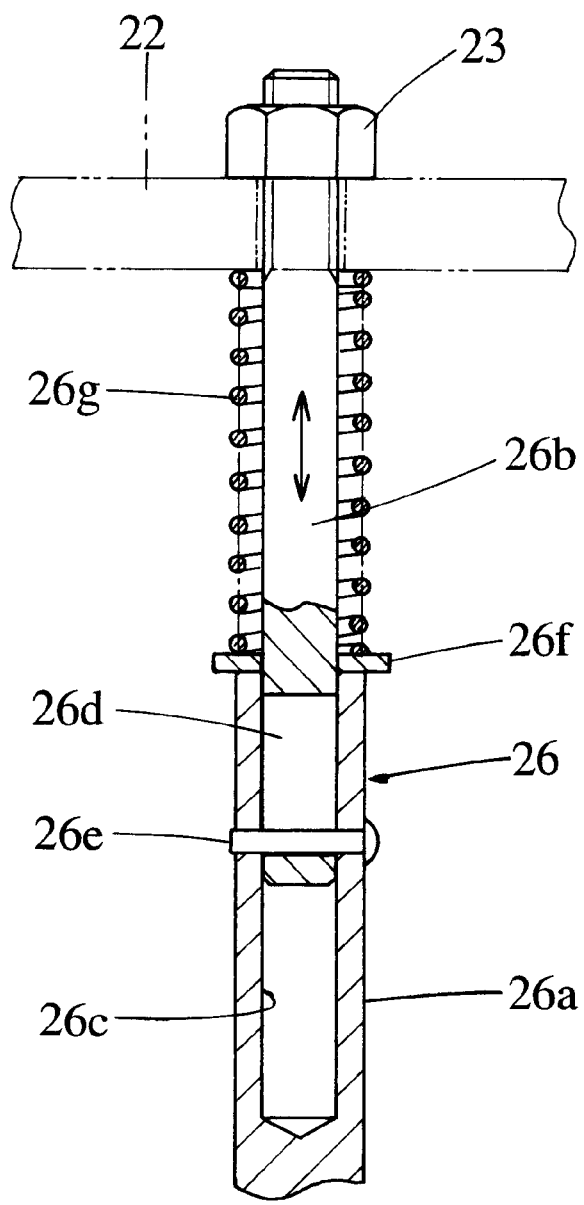
FIG. 6 is an enlarged cross-sectional view illustrating a part of a push-down rod for the molding dies in the apparatus.

Each of the above-mentioned push-down rods 26 . . . , as shown in FIG. 6, is composed of a large diameter rod part 26a and a small diameter rod part 26b having its lower part slidably fitted in a fitting hole 26c formed in the center of the upper part of the large diameter rod 26a, and accordingly, it is extendable and retractable. Further, the lower part of the small diameter rod part 26b is formed therein with an axially elongated hole 26d which pierces therethrough, and a pine 26e which pierces through the large diameter rod part 26a and which is fixed to the same is slidably engaged in the elongated hole 26d so as to inhibit the large and small diameter rod parts 26a, 26b from coming off from each other, and, to maintain the extending and retracting stroke thereof to be constant.

Further, a compression spring 26g is fitted on the small diameter rod part 26b which is engaged at its opposite ends with a spring retainer 26f provided at the upper end of the large diameter rod part 26a and with the upper elevatable panel 22, and accordingly, the plate board 25 is depressed through two stages by the elevating mechanism H.

The above-mentioned push-down rods 26 . . . are slidably inserted in through-holes 20a . . . and 33a . . . which are formed in the lower elevatable panel 20 and a horizontal base board 33 of the housing 17, respectively, as shown in FIGS. 1 and 3. Further, each of the push-down rod 26 . . . is provided in its lower part with a stopper 26h which abuts against the lower surface of the lower elevatable panel 20 for pushing up the lower elevatable panel 20.

Further, crosswise long guide holes 20b, 20b, 33b, 33b are formed in the left and right sides of the lower elevatable panel 20 and the base board 33, vertically piercing therethrough, as shown in FIGS. 1 to 3, and the support bars 31, 31 of the molding dies 32, 32 are slidably inserted in the guide holes 20b, 20b, 33b, 33b.

Figure 4:
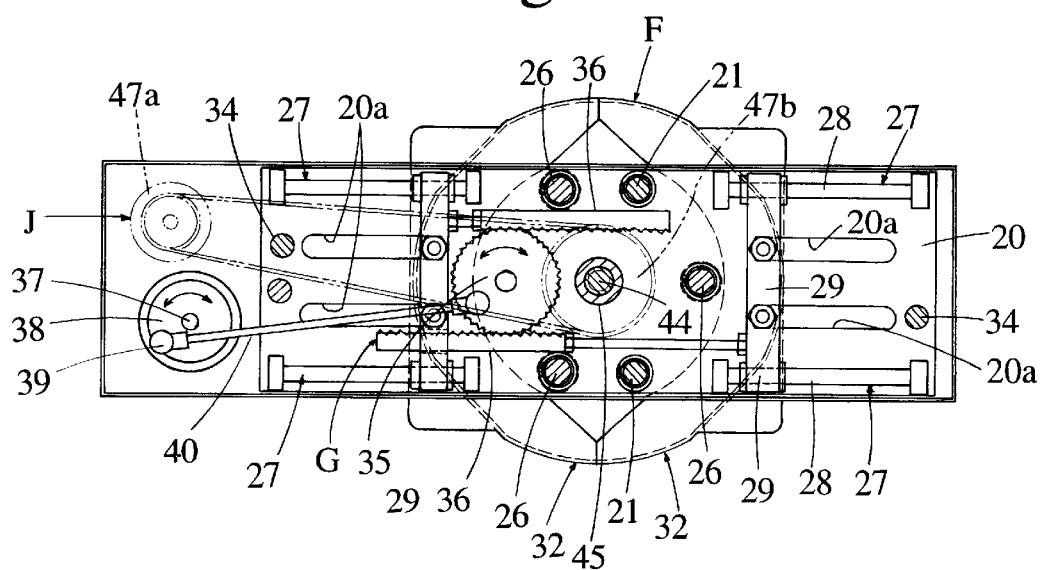
FIG. 4 is a sectional view as viewed in the direction of the arrows along line B—B in FIG. 3.
Figure 14:
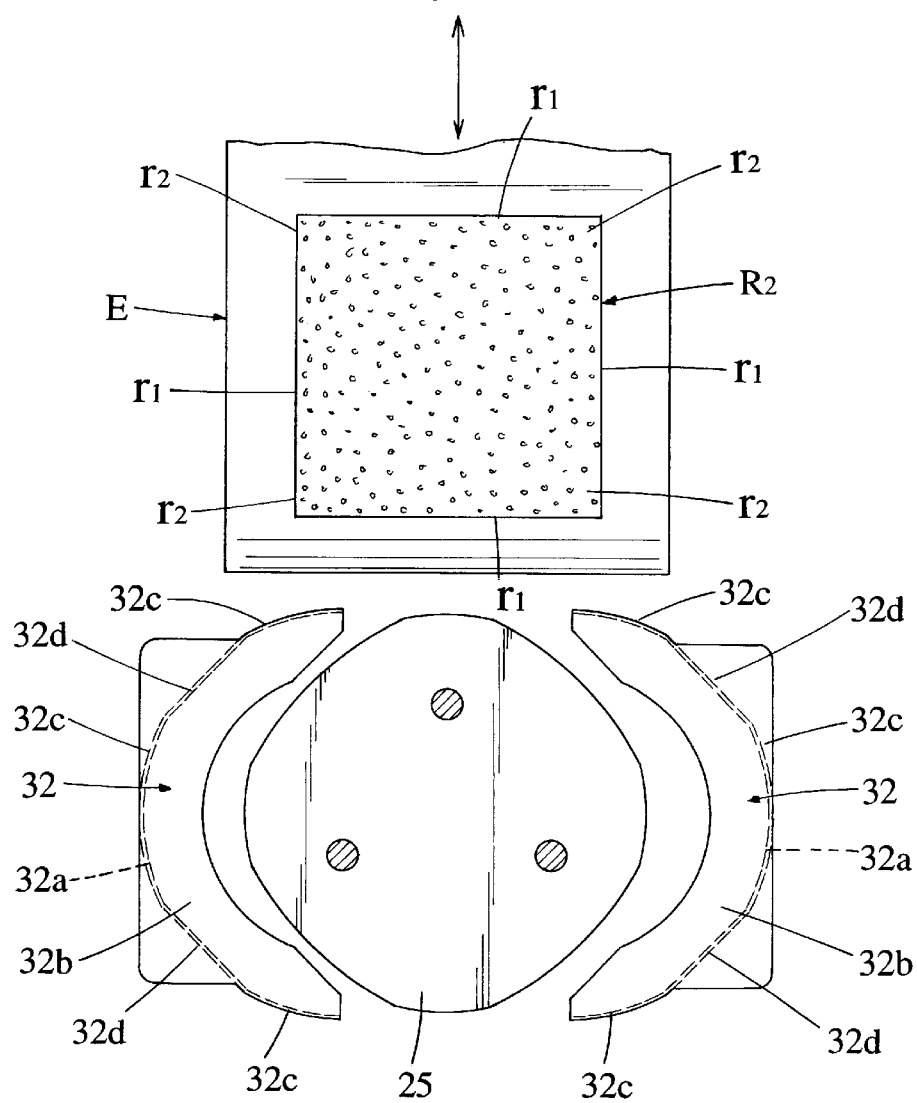
FIG. 14 is a plan view illustrating such a condition that the molding dies are opened, and the planar rice food is transferred by the feed conveyer belt to a position near the molding dies.

As shown in FIGS. 2, 4 and 14, the pair of molding dies 32, 32 are composed of vertical side panels 32a formed of thin wall metal plates which are symmetrically curved outward, and top panels 32b bent by a right angle so as to be extended inward from the upper ends of the side panels 32a and to be opposed to each other, the top panels having an arcuate shape as viewed in a plan view. However, the above-mentioned side panels 32a for forming the external shape of a pizza rice are not formed into an arcuate shape in its entirety, as viewed in a plan view, but are composed of side molding parts 32c, 32c for molding side parts $r_1, r_1, r_1, r_1$ of the square planar rice food $R_2$, which are formed in an arcuate shape as viewed in a plan view, and corner molding parts 32d, 32d . . . for molding corner parts $r_2, r_2, r_2, r_2$ thereof, which are formed into a flat surface shape so as to be projected inward from the side molding parts 32c, 32c . . . , or which are formed into an inward concave shape.

Figure 15:
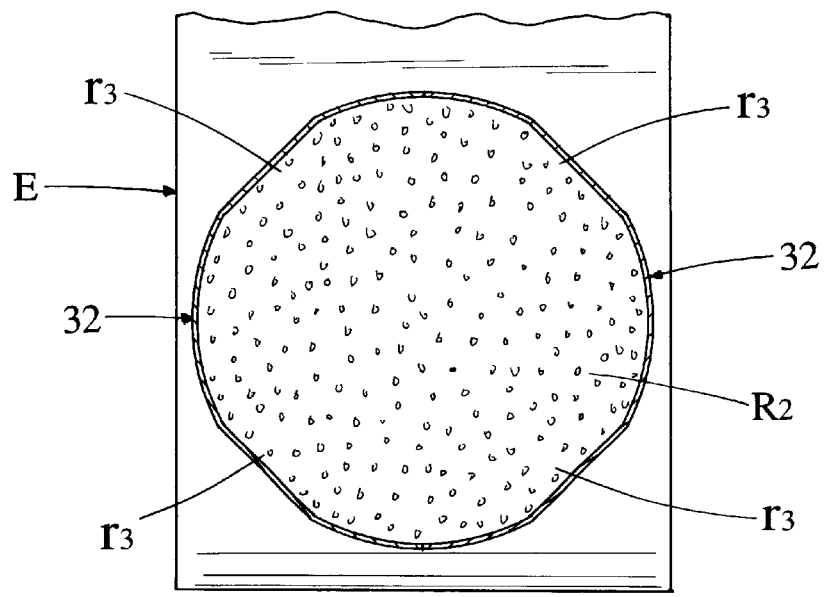
FIG. 15 is a plan view illustrating such a condition that the molding dies are closed so as to mold the planar rice food.
Figure 16:
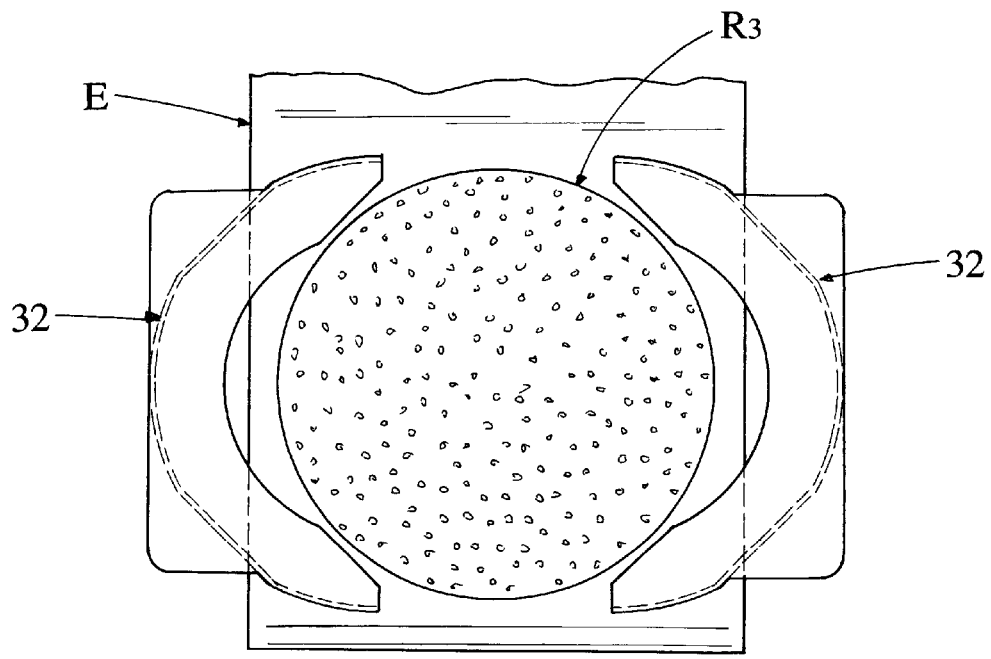
FIG. 16 is a plan view illustrating a condition in which the molding dies are opened so as to obtain a pizza rice.
Figure 17:
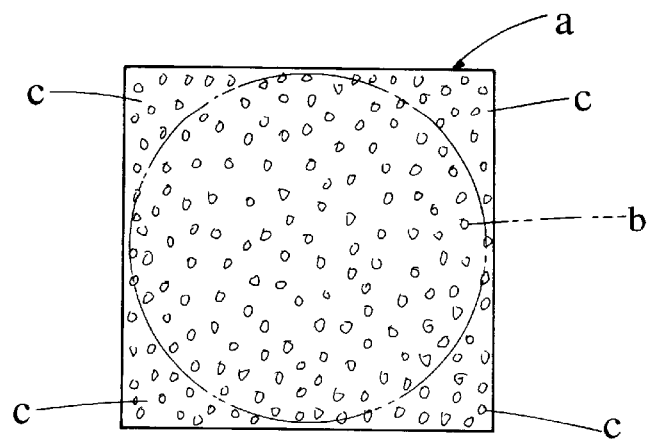
FIG. 17 is a plan view illustrating a condition in which a square planar rice food is molded into a disc-like pizza rice in a conventional pizza rice molding apparatus.
Figure 18:
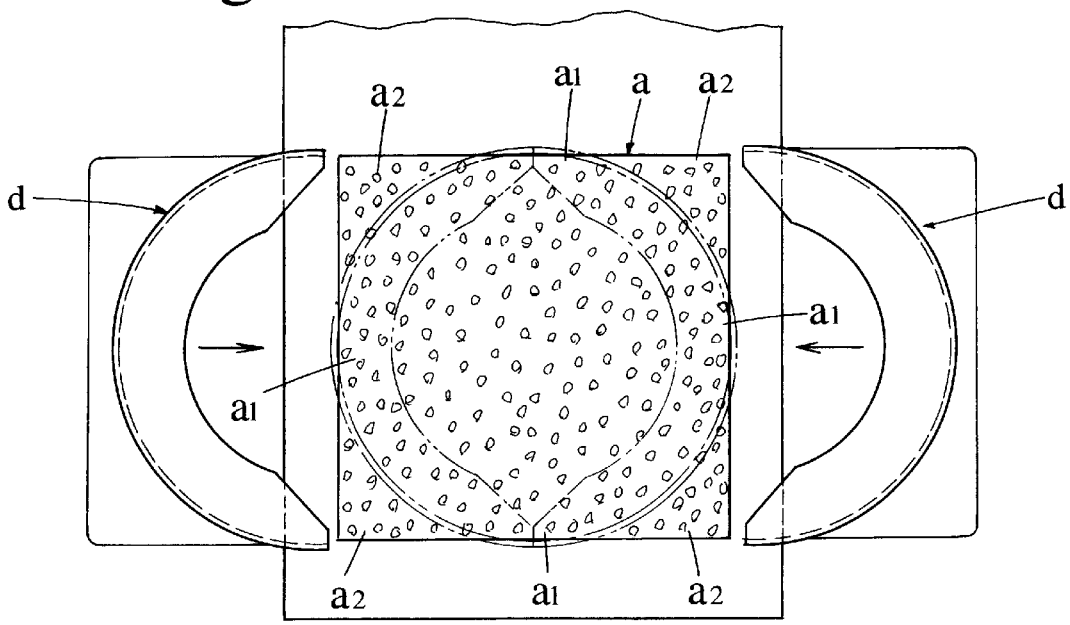
FIG. 18 is a plan view illustrating a comparison example of a pizza rice molding apparatus.
Figure 19:
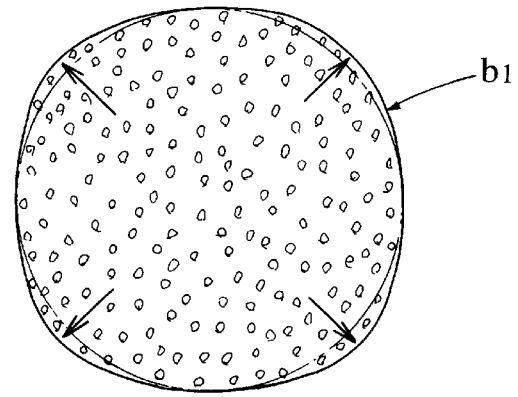
FIG. 19 is a plan view illustrating a pizza rice molded with the use of the pizza rice molding apparatus in the comparison example.

That is, the pair of molding dies 32, 32 can mold the corner parts $r_2$ . . . of the square planar rice food $R_2$ into segmental parts $r_3$ . . . , as shown in FIG. 15, and accordingly, the rice food is formed into a deformed disc-like shape in its entirety. The segmental parts $r_3, r_3$ . . . are outward restored by the elasticity of the rice food after opening the molding dies 32, 32, and is accordingly formed into a disc-like shape as shown in FIG. 16.

The dimensions by which the corner molding parts 32d, 32 . . . are projected inward from the inner surfaces of the side molding parts 32c, 32, are previously set so as to match with the degree of restoration of the corner parts $r_2, r_2$ after compression molding.

The molding frame F having the above-mentioned arrangement is incorporated in the housing 17 by elevatably supporting the lower elevatable panel 20 to support posts 34, 34 fixed upright on the right and left sides of the upper surface of the base board 33, as shown in FIGS. 1 to 4.

In the opening and closing mechanism G for the molding dies 32, as shown in FIGS. 1 to 4, a pinion 35 journalled to the upper surface of the lower elevatable panel 20, is meshed with racks 36, 36 which are horizontally projected inward from the slide bars 29, 29, and the pinion 35 is associatingly coupled to a rotary plate 38 which is fixed to a drive shaft 37 of the drive source I including a reversible motor located on the base board 33 so as to be normally and reversely rotated by means of a drive rod 40 through the intermediary of a universal joint 39. Thus, the pinion 35 can be normally and reversely rotated, and therefore, the pair of molding dies 32, 32 are moved in opposite directions so as to be closed or are moved symmetrically so as to be opened.

In the elevating mechanism H for the molding die F, as shown in FIGS. 1 to 4, the center part of the base board 33 and a ball screw 44 which is vertically supported to a horizontal panel 41 fixed to the upper part of the housing 17 by means of bearings 42, 43, are threadedly engaged in a ball nut 45 fixed to the upper elevatable panel 22, and the ball screw 44 and a drive shaft 46 of the drive source J including a servo-motor are associatingly coupled with each other by a winding type transmission mechanism including a belt or a chain. It is noted that reference numerals 47a, 47b denote pulleys, respectively.

Figure 7:
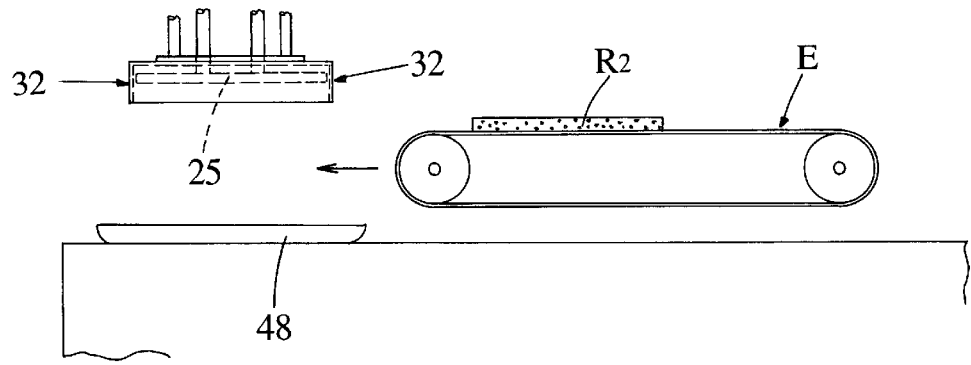
FIG. 7 is a view for explaining a condition in which the molding dies are opened and held at a raised position, and a planar rice food conveyer belt is held at a retracted position.
Figure 8:
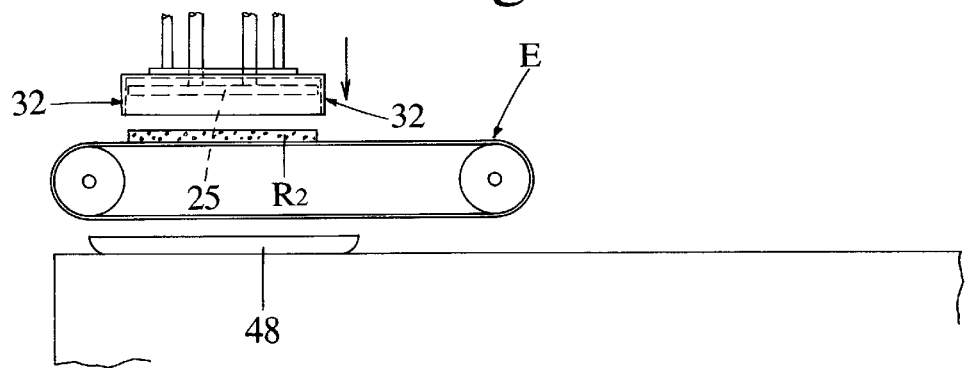
FIG. 8 is a view for explaining a condition in which the molding dies are opened, and the planar rice food conveyer belt is advanced to a position below the molding dies.
Figure 9:
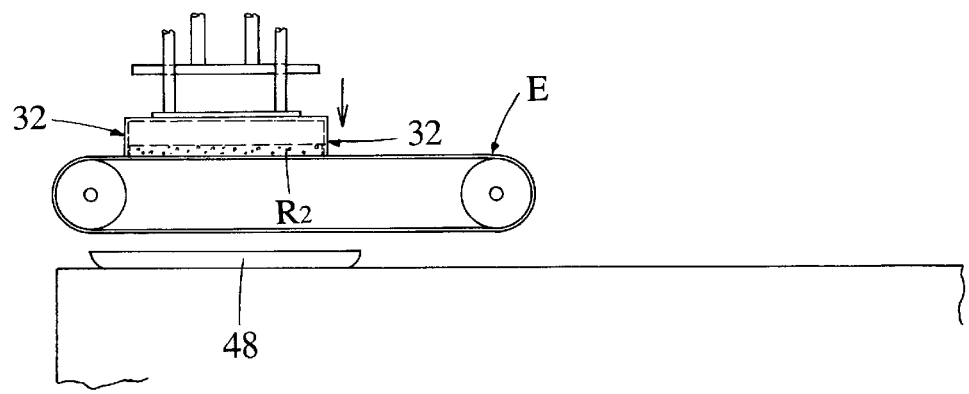
FIG. 9 is a view for explaining a condition in which the molding dies are opened, and are lowered.

Thus, with the use of the pizza rice apparatus having the above-mentioned structure, a planar rice food $R_1$ fed from the rice food supply mechanism and compressed into a predetermined thickness by the rice food compressing mechanism B, is cut into a square planar rice food $R_2$ having a predetermined size by the planar rice food cutting mechanism C, and is shifted by means of an intermittent transfer conveyer belt D onto the planar rice food feed conveyer belt E which is rotated forward while it is moved forward as shown in FIG. 7. Thus, the planar rice food $R_2$ is transferred to a position below the pair of molding dies 32, 32, as shown in FIG. 8, and at this time, the molding dies 32, 32 are opened by the opening and closing mechanism G, as shown in FIG. 2, and are held at the raised position by the elevating mechanism H, as shown in FIG. 1. When the square planar rice food $R_2$ is transferred to the position below the molding dies 32, 32, the elevating mechanism H is operated so that the molding dies 32, 32 and the opening and closing mechanism G are lowered, as shown in FIG. 9. Thus, the opening and closing mechanism G is operated so as to open and close the molding dies 323, 32 in order to compress the square planar rice food $R_2$ on the right and left sides thereof.

Figure 10:
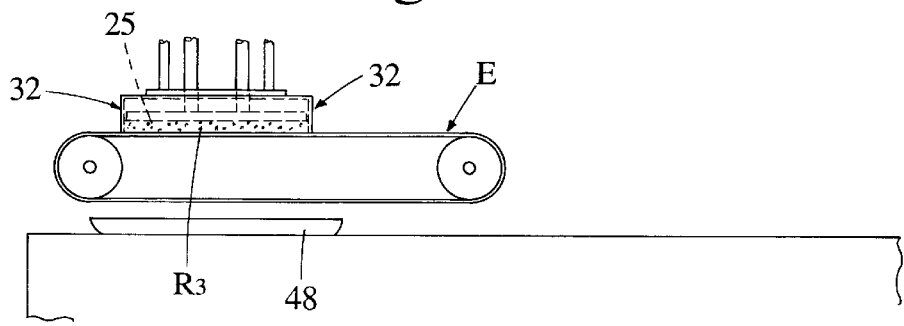
FIG. 10 is a view for explaining a condition in which the planar rice food on the planar rice food transfer conveyer belt is molded by closing the molding dies.

Then, the press board 25 is lowered by the elevating mechanism G so that the planar rice food $R_2$ is compressed downward, as shown in FIG. 10. Accordingly, the planar rice food $R_2$ is compressed and molded into the one having a predetermined thickness and a shape corresponding to the internal shape defined by the closed molding dies 32, 32, that is, a deformed disc-like shape.

Figure 11:
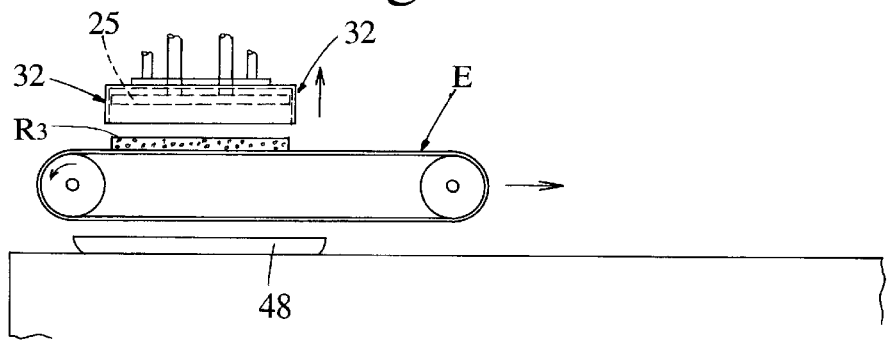
FIG. 11 is a view for explaining a condition in which the molding dies are opened, and are elevated after molding a pizza rice.

Then, the opening and closing mechanism G is operated so that the molding dies 32, 32 are opened, as shown in FIG. 16, and thereafter, the elevating mechanism H is operated so that the opening and closing mechanism G, the molding dies 32, 32, and the press board 25 are elevated, as shown in FIG. 11, and are stopped and held at the upper limit position.

Figure 12:
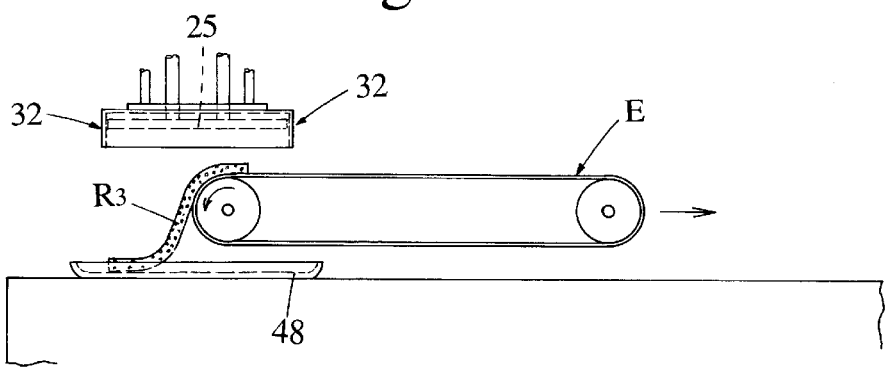
FIG. 12 is a view for explaining a condition in which the molding dies are held at a raised position, and the pizza rice is dropped from the feed conveyer belt and fed onto a receiving pan.
Figure 13:
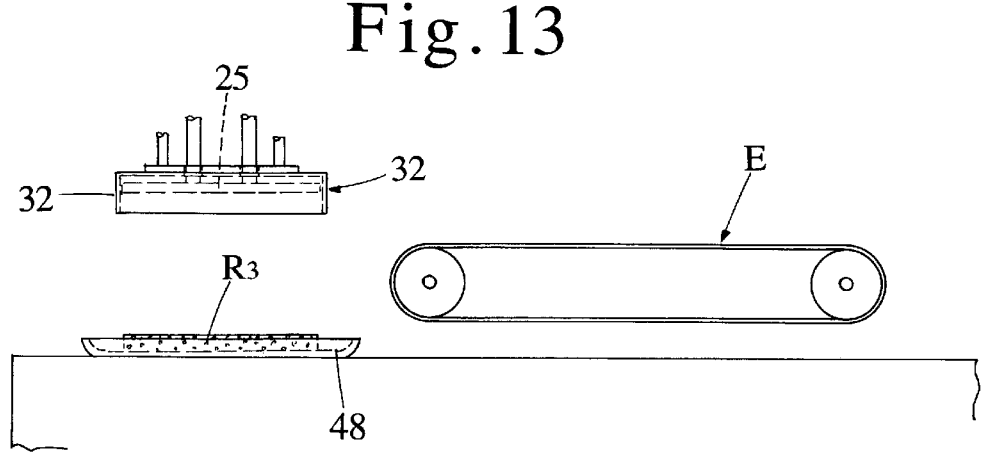
FIG. 13 is a view for explaining a condition in which the pizza rice is fed onto the receiving pan, and the feed conveyer belt is retracted.

Next, the feed conveyer belt E is rotated while it is retracted as shown in FIG. 12, and accordingly, a molded pizza rice $R_3$ is dropped from the feed conveyer belt R and is then fed into a receiving pan 46, as shown in FIG. 13.

Thus, the square planar rice food $R_2$ is molded into a deformed disc-like shape with the corner parts $r_2$ . . . being turned into the segmental parts $r_3$ . . . , as shown in FIG. 5, through the closing of the molding dies 32, 32 and the lowering of the press board 25, and the segmental parts $r_3$ . . . are outward restored by the elasticity of the rice food after the opening of the molding dies 32, 32 and the elevation of the press board 25. Accordingly, the pizza rice $R_3$ finally has a substantially true circular shape, as shown in FIG. 16.

According to the present invention, as mentioned above, the square planar rice food can be directly molded into a disc-like shape without cutting, it is possible to eliminate the necessity of a cutting step, a step of collecting remaining rice foods after cutting, and a step of reusing the corrected rice foods which have been conventionally required, thereby it is possible to remarkably enhance the molding efficiency. Further, since the rice food remaining after cutting is not reused, thereby it is possible to produce a high quality pizza rice having a good taste and food feeling.

In particular, according to the present invention, the pair of molding dies have parts which correspond to the side parts of a square planar rice food, and which are formed into arcuate side molding parts, and parts which correspond to the corner part thereof and which are formed into corner molding parts projected inward from the side molding parts, and accordingly, the planar rice food can be molded into a deformed disc-like shape as viewed in a plan view, having the corner parts which are formed into segmental parts, and accordingly, since the segmental parts are restored outward by the elasticity of the rice food, the pizza rice having a substantially true circular disclike shape as viewed in a plan view, and having a valuable quality can be simply and surely molded.

What is claimed is:

1. A molding apparatus for pizza rice, comprising a feed conveyer belt which can be longitudinally moved back and forth, for intermittently feeding a square planar rice food which has been compressed and fed onto the belt conveyer, a molding frame composed of a pair of molding dies which are curved outward symmetrically, and which are arranged so as to be openable and closable in a direction orthogonal to the longitudinal direction of the feed conveyer belt, and an opening and closing mechanism and an elevating mechanism for the pair of molding dies, wherein the pair of molding dies have parts which correspond to side parts of a square planar rice food and which are formed into arcuate side molding parts, and parts which correspond to corner parts thereof, and which are formed into corner molding parts which are convex inward from the arcuate side molding parts, and accordingly, the planar rice food is formed into a deformed disc-like shape in a plan view, having the corner part which are segmental.

* * * * *